T. L. BRUMBACK.
CORN HUSKER.
APPLICATION FILED MAR. 22, 1906.

903,446.

Patented Nov. 10, 1908.

3 SHEETS—SHEET 1.

Witnesses
J. M. Fowler Jr
L. G. Morrill

Inventor
Theodore L. Brumback.
By
Mason Fenwick & Lawrence
Attorneys

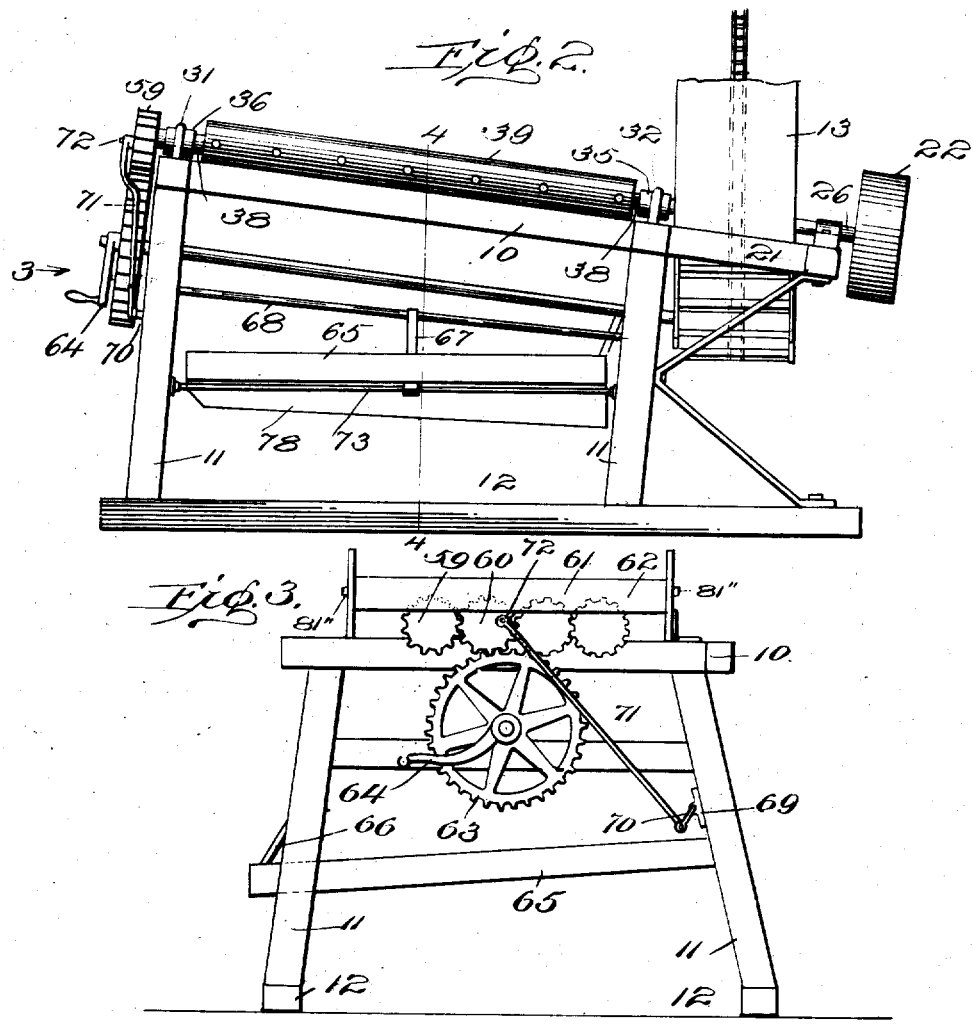

T. L. BRUMBACK.
CORN HUSKER.
APPLICATION FILED MAR. 22, 1906.
903,446.
Patented Nov. 10, 1908.
3 SHEETS—SHEET 3.
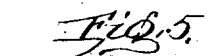
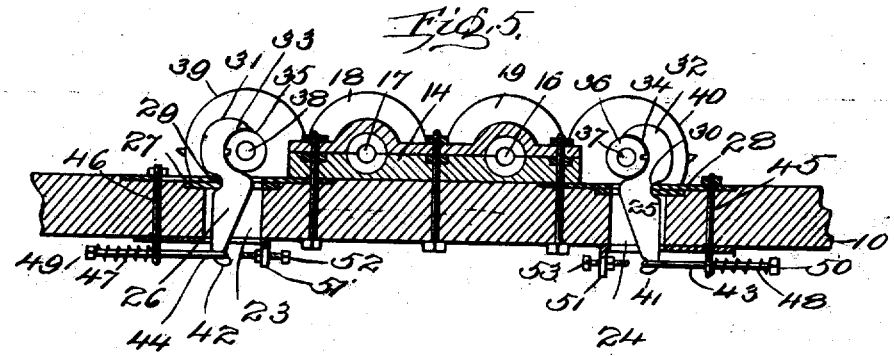
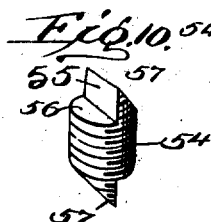
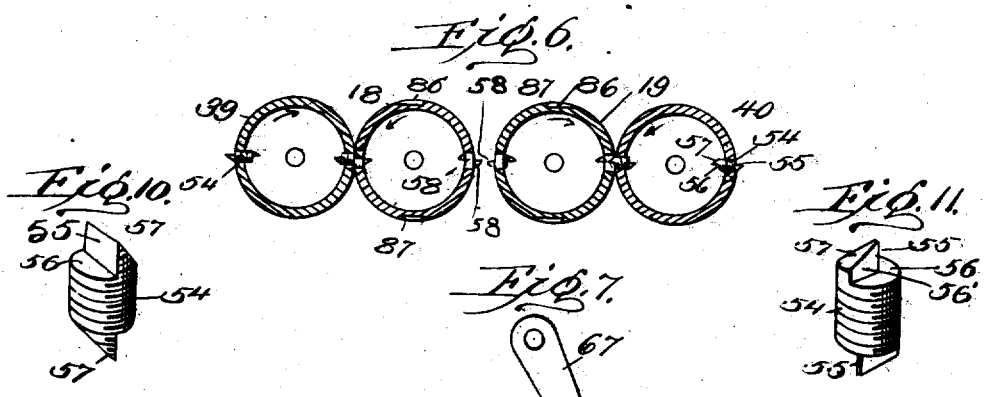
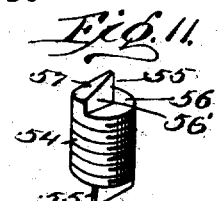
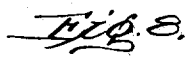
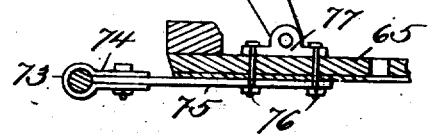
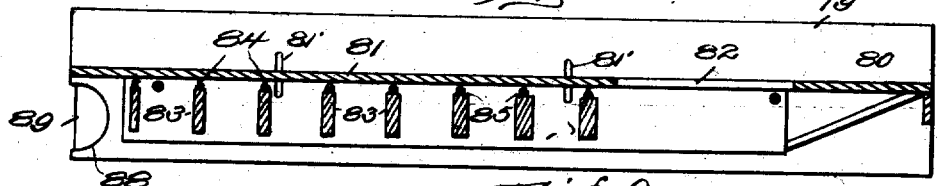
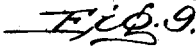
Witnesses
J. M. Fowler Jr.
L. R. Morrill
Inventor
Theodore L. Brumback
By Mason Fenwick & Lawrence
Attorneys

UNITED STATES PATENT OFFICE.

THEODORE L. BRUMBACK, OF STANLEYTON, VIRGINIA.

CORN-HUSKER.

No. 903,446.        Specification of Letters Patent.        Patented Nov. 10, 1908.

Application filed March 22, 1906. Serial No. 307,501.

*To all whom it may concern:*

Be it known that I, THEODORE L. BRUMBACK, a citizen of the United States, residing at Stanleyton, in the county of Page and State of Virginia, have invented certain new and useful Improvements in Corn-Huskers; and I do hereby declare the following to be a full, clear, and exact description of the invention, such as will enable others skilled in the art to which it appertains to make and use the same.

This invention relates to corn husking machines, and has for an object to provide a machine of the class embodying new and improved features of economy, convenience and efficiency.

A further object of the invention is to provide machines of the class embodying rotating husking rolls with improved means for holding the said rolls yieldingly in operative relation.

A further object of the invention is to provide a machine of the class embodying a shaking screen disposed beneath the husking rolls and of improved means operative from the said rolls for actuating the shaking screen.

A further object of the invention is to provide a machine of the class embodying husking rolls supplied with removable and interchangeable husk-engaging teeth of improved form and construction.

With these and other objects in view, the invention comprises certain novel constructions, combinations and arrangements of parts, as will be hereinafter fully described and claimed.

Figure 1:
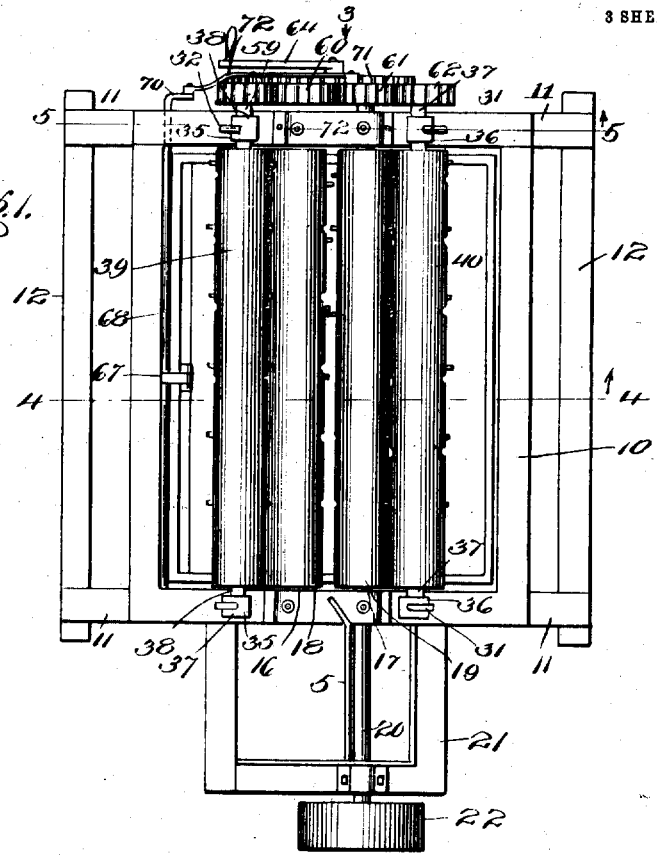
Figure 4:
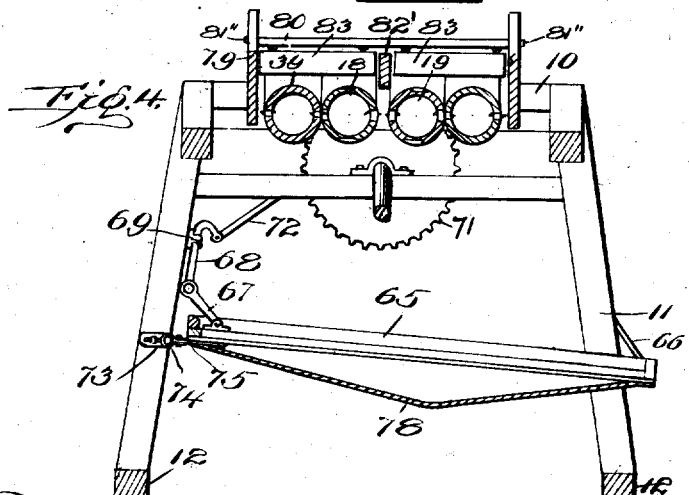

In the accompanying drawings:—Figure 1 is a top plan view of the improved husking machine, with the ear engaging cover removed. Fig. 2 is a view of the husking machine in side elevation. Fig. 3 is a view of the husking machine in end elevation as seen along arrow 3 of Figs. 1 and 2. Fig. 4 is a vertical transverse sectional view of the improved machine as on line 4—4 of Figs. 1 and 2. Fig. 5 is a transverse sectional detail view of the yielding means for holding the rolls in operative relation and as seen on line 5—5 of Fig. 1. Fig. 6 is a transverse detail view of the husking rolls as on line 6—6 of Fig. 1. Fig. 7 is a detail section view of a portion of the shaking screen and showing in elevation the actuating means and the connection with a resilient cushioning bar. Fig. 8 is a longitudinal vertical sectional view of the cover hinged upon the improved husking machine and above and covering the rolls. Fig. 9 is a detail side elevation of one end of the side of the hinged cover showing an opening and a yielding closure for permitting the corn easy access to the conveyer spout. Fig. 10 is a perspective view of one form of husk engaging tooth. Fig. 11 is a perspective view of a slightly different form of husk engaging tooth.

Like characters designate corresponding parts throughout the several views.

In its preferred embodiment, the improved machine forming the subject-matter of this application, comprises a frame 10 supported in any approved manner, as upon the legs 11, which may be in turn supported upon the base pieces 12. The frame 10 is so disposed and secured upon the supporting means as the legs 11 as to be in an inclined position as particularly shown in Fig. 2, the inclination being longitudinal of the machine, and sloping toward the conveyer 13 of any approved form. Upon the frame 10 are rigidly secured the pillow blocks 14 and 15 providing alined bearing openings for journaling the trunnions 16 and 17 of the rolls 18 and 19, respectively, which are thereby permitted a rotary movement but held from lateral displacement. The trunnion of one of said rolls, as 17, is extended as at the shaft 20 outwardly from the machine through an off-set frame portion 21, and thereupon is rigidly secured any convenient means for applying power to the said rolls as the belt pulley 22.

Adjacent the ends of the pillow blocks 14 and 15, the end pieces of the frame 10 are provided with apertures 23 and 24, extending vertically through the said pieces, and therein are secured the levers 25 and 26 by means of plates 27 and 28, rigidly secured to the top surface of the said frame 10, and engaging within a notch or recess 29 and 30, respectively, to form a fulcrum for the said levers. The upper ends of the said levers 25 and 26 are extended above the frame piece 10 as at 31 and 32, and are provided with concaved faces, as 33 and 34, for engaging substantially cylindrical bearing blocks 35 and 36, in which are journaled the trunnions 37 and 38 of the outer rolls 39 and 40. The lower ends of the levers 25 and 26 extend below the frame piece 10 and are provided with hooked portions 41 and 42, engaging eye bolts 43 and 44, which extend through other eye bolts 45 and 46, and are provided with compression springs 47 and 48, and tension nuts 49 and 50, whereby the tension of the said springs is varied. To limit the movement of the levers 25 and 26 against the tension of the springs 47 and 48, brackets 51 and 51' are provided with screws 52 and 53, extending therethrough and disposed in the path of movement of the said levers 25 and 26, and adjustable longitudinally to vary the movement of the said levers. The several rolls 18, 19, 39 and 40 are provided with internally screw-threaded openings for receiving teeth 54, externally screw-threaded to engage the several openings and divided longitudinally from each end upon a plane 55, diametrical to the said teeth, forming shoulders 56, which, when in operative position register substantially with the external surface of the rolls and with the remaining upstanding half of the tooth beveled as at 57 to form a spur outstanding from the face of the roll positioned to engage loosely within openings 58 formed in the opposing roll. Instead of leaving the upstanding portion of the tooth to present a diametrical plane, the said portion is cut away as at 56' to form an upstanding portion substantially triangular in cross section and with the apex of the triangle moving forwardly to pass between the kernels upon the ear whereby shelling of the corn is largely obviated. While the said rolls may each be provided with teeth as described throughout their entire length, it is found in practice that it is unnecessary to supply teeth to all of the said rolls at their lower or rear ends, for the reason that the ears of corn, when first introduced into the machine, are inclosed in husks of greater thickness, which require a great number of teeth to remove, and that as the work of husking progresses, the greater the number of teeth the greater amount of corn will be accidentally shelled from the ear, and it has been found, in practice, advisable to omit the teeth from the lower or rear ends of one of each pair of co-acting rolls, as shown in the center rolls particularly in Fig. 1.

For communicating motion from the roller 19, which is positively driven from the shaft 20, the several rolls are provided with interengaging gears as 59, 60, 61 and 62, whereby the said rolls are rotated in the directions as indicated by the arrows in Fig. 6, and a gear wheel 63 is secured to one end of the machine engaging one of the said gears as 60, and provided with any approved means as the crank 64 for rotating the said gears and rolls manually, when it is found desirable for any purpose to so operate them.

Beneath the rolls is disposed a screen 65 of any approved construction and supported by means of links 66, pivotally secured to the legs 11 at one end, and to one side of the screen 65 at their other ends, while the other side of the screen is supported by means of a lever 67, rigidly secured upon a shaft 68, mounted in bearings 69, rigidly secured to the legs 11, and disposed at an inclination substantially in parallelism with the rolls. At the forward end of the machine, the shaft 68 is bent to form a crank arm 70, connected by means of the pitman rod 71 with the wrist pin 72 carried upon one of the gears, as 60, from which the shaft 68 receives an oscillating motion. Longitudinally of the machine and between the end legs 11 is secured a resilient rod 73, about the middle of which is secured a clip 74 with a strip 75 extending therefrom and rigidly secured to the screen 65, as shown in detail in Fig. 7, and preferably by means of bolts 76 which also secure upon the upper side the clip 77 to which is pivoted the crank arm 67. The resilient rod 73 serves to support the screen and to impart thereto a peculiar springy or jerky motion by which kernels of corn are dislodged from the meshes of the screen and together with the husks thrown off. Beneath the screen 65 is secured the usual apron 78 inclined from opposite sides toward the middle and toward one end for delivering material therefrom to a conveniently disposed receptacle.

Above the rolls, as a protection, is disposed a cover 79 comprising side pieces extending longitudinally of the machine and positioned upon the outside of and adjacent to the outer rolls 39 and 40, and with cross pieces, as 80, adjacent the upper end of the machine and with a long piece or covering member 81 at the lower end of the machine defining an opening 82 adjacent the upper ends of the rolls and through which the material is fed to the machine. Extending longitudinally of the machine and between the middle rolls 18 and 19 is a division strip 82' and between the said division strip and the side pieces are hinged down-hanging plates 83, which, in normal position, extend towards the upper surface of the rolls and serve to hold the ears of corn in operative positions between the said rolls, while the husks are being removed therefrom. The down-hanging plates 83 preferably diminish in weight from the upper toward the lower end of the machine, for the reason that when the ear of corn is provided with a greater number of husks, greater weight is desirable to hold the ear in contact with the husking roll. To accomplish the difference in weight of the said plates, they are preferably constructed equal in dimension longitudinally and laterally, but increasing in thickness from the lower toward the upper end of the machine, as shown in Fig. 8. The plates 83 may be hinged in any preferred manner, but it is found advisable to secure them by means of staples 84 in the cover member 81, and staples 85 in the upper edges of the said plates 83, whereby the plates swing loosely but pivotally downward from the inner and under surface of the said cover member 81. The said cover member 81 to which the plates 83 are hinged is arranged for vertical movement between the side pieces 79 by means of slots 81' through which are extended screws or other clamping means 81'' so that the said plates may be raised or lowered relative to the rolls for the accommodation of ears of varying sizes and husks of varying thicknesses.

While it is designed to supply the machine only with ears of corn removed from the stalks, it sometimes happens that stalks are accidentally inserted into the machine and to provide for disposing of such stalks, the rolls are provided with longitudinal grooves 86 having each a shouldered side 87 which are in position to engage a stalk lying longitudinally between the rolls and to provide increased space to permit the passage of the stalks between the rolls. In case the stalk is not removed from the ear while passing through the rolls, it may interfere with the passage of the ear from the lower ends of the rolls to the conveyer and to provide for such passage the lower end of the side pieces of the cover 79 is provided with an aperture or opening 88 of any approved form, herein shown in semi-circular and with a door or covering member 89 hinged thereover as at 90 and held normally in a closed position by means of a spring 91 secured one end to the door and the opposite end to the side piece.

In operation it will be understood that "jerked" corn will be fed to the machine by dropping ears continuously through the feed opening 82 upon the upper surface of the upper end of the husking rolls 18, 19, 39 and 40, which are rotated by means of the rotating shaft 21 and the interengaging gears 59, 60, 61 and 62. The inclination of the rolls will cause the corn to move toward the rear end of the machine in the usual well known manner, and in its passage husks will be engaged by the teeth 54 to draw them between the husking rolls, which will finish the removal of the husks from the ear whereupon the ear drops downwardly through the off-set frame 21 into the conveyer 13, which may be of any approved form and construction. In the process of husking some corn will be shelled from the ears being operated upon and will fall between the rolls with the husks which have been removed from the ears and drop upon the screen 65. The movement of the screen provided by the oscillating shaft 68 and crank arm 67 causes the husks to be thrown from off the screen, while the shelled corn passes through the screen upon the apron 78 and downwardly into any convenient receptacle in the usual well known manner.

The construction of the husker above described is such that blast fans for cleaning shelled corn may be and are preferably omitted from the structure whereby cracked or partially powdered kernels of corn caused by being engaged with the husking teeth is not blown away and lost.

What I claim is:—

1. In a husking machine, a frame, husking rolls journaled upon the frame, a screen mounted beneath the rolls, a shaft mounted upon the frame and free to oscillate, a crank arm carried by the said shaft and connected to the screen, and means connecting one of the rolls and shaft whereby a rotary movement of the rolls oscillates the shaft.

2. In a husking machine, a frame, husking rolls journaled upon the frame, a screen disposed beneath the rolls, a resilient bar extending longitudinally of the frame, means connecting the screen to the middle of the bar, and means for communicating movement from the rolls to the screen.

3. In a husking machine, a frame, a resilient bar mounted upon the frame, husking rolls journaled upon the frame, means to rotate the rolls, a screen disposed beneath the rolls, a shaft journaled upon the frame, and free to oscillate, a crank arm carried by the shaft and connected at its outer end to the screen, means connecting the shaft to the rolls whereby a rotary movement of the rolls is communicated to the shaft as an oscillating movement, and means connecting the screen to the resilient bar.

4. In a husking machine, husking rolls provided with tooth-receiving openings, and a cylindrical tooth proportioned for engagement within said opening and divided at its end by a diametric plane extending throughout a portion of its length and with the remaining half tapered obliquely to the diametric plane.

5. In a husking machine, a frame, husking rolls journaled in the frame, a cover disposed upon the frame and comprising side pieces extending longitudinally of the frame and in parallelism with the rolls, spaced plates disposed transversely between the side pieces and hinged in position to hang normally downwardly adjacent the upper surface of the rolls, the said plates decreasing in thickness toward the lower end of the side pieces, and adapted to swing normally adjacent the upper side of the rolls.

In testimony whereof I affix my signature in presence of two witnesses.

THEODORE L. BRUMBACK.

Witnesses:
J. B. BRUMBACH,
LAWRENCE T. BERRY.